US012621016B2

(12) United States Patent
Barany

(10) Patent No.: US 12,621,016 B2
(45) Date of Patent: May 5, 2026

(54) FREQUENCY CONVERTING CABLE NETWORK SIGNAL TRANSMISSION DEVICES

(71) Applicant: PPC BROADBAND, INC., East Syracuse, NY (US)

(72) Inventor: David A. Barany, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 307 days.

(21) Appl. No.: 18/205,358

(22) Filed: Jun. 2, 2023

(65) Prior Publication Data

US 2023/0308127 A1 Sep. 28, 2023

Related U.S. Application Data

(63) Continuation of application No. 17/850,099, filed on Jun. 27, 2022, now Pat. No. 11,716,109, which is a
(Continued)

(51) Int. Cl.
*H04B 1/18* (2006.01)
*H04B 1/10* (2006.01)
(Continued)

(52) U.S. Cl.
CPC ............. *H04B 1/18* (2013.01); *H04B 1/1018* (2013.01); *H04B 1/1607* (2013.01); *H04B 1/3805* (2013.01); *H04B 2001/3811* (2013.01)

(58) Field of Classification Search
CPC ............... H04N 21/6118; H04N 7/104; H04N 21/6168; H04N 7/17309; H04N 7/106;
(Continued)

(56) References Cited

U.S. PATENT DOCUMENTS

| | | | |
|---|---|---|---|
| 5,493,718 A | 2/1996 | Bayruns | |
| 6,184,920 B1 | 2/2001 | Masuda et al. | |

(Continued)

FOREIGN PATENT DOCUMENTS

TW 201203889 A 1/2012

OTHER PUBLICATIONS

Author Unknown, Taiwan Office Action dated May 6, 2022, TW Application No. 110122943, 4 pages.
(Continued)

*Primary Examiner* — Golam Sorowar
(74) *Attorney, Agent, or Firm* — MH2 Technology Law Group, LLP

(57) ABSTRACT

A network communication device includes a first output port, a second output port, and a converting circuit. The first output port may be in communication with an input port and may be configured to receive a first reduced-power version of the signal received at an input port. The converting circuit may be configured to receive a second reduced-power version of the signal, down-convert a high-frequency portion thereof, and produce a down-converted signal. The first and the second reduced-power versions of the signals are in the same frequency band. The second output port receives at least a portion of the down-converted signal such that the high frequency portion of the second reduced power version of the signal is attenuated before the signal is transmitted to a subscriber device.

17 Claims, 3 Drawing Sheets

Related U.S. Application Data continuation of application No. 17/353,122, filed on Jun. 21, 2021, now Pat. No. 11,374,604.

(60) Provisional application No. 63/042,627, filed on Jun. 23, 2020.

(51) Int. Cl.
  *H04B 1/16*     (2006.01)
  *H04B 1/3805*   (2015.01)

(58) Field of Classification Search
  CPC ............ H04N 7/102; H04N 7/10; H04N 7/22; H04N 21/436; H04N 21/615; H04N 21/2221; H04N 21/6106; H04N 7/20; H04N 21/2385; H04L 12/2801; H04L 12/2898; H04L 12/2838; H04L 5/1461; H04L 12/2869; H04L 12/2861; H04L 5/08; H04L 12/2885; H04L 5/143; H04L 12/10; H04L 12/2889; H04L 12/6418; H04L 12/66; H04L 2012/6421; H04B 10/25751; H04B 10/27; H04B 10/2507; H04B 10/2589; H04B 10/2575; H04B 3/46; H04B 10/29; H04B 10/50; H04B 10/075; H04B 10/07955; H04B 10/272; H04B 10/516; H04B 10/564; H04B 10/58
  See application file for complete search history.

(56) References Cited

U.S. PATENT DOCUMENTS

| | | | |
|---|---|---|---|
| 6,832,071 | B1 | 12/2004 | Nakamura |
| 7,103,331 | B2 | 9/2006 | Motoyama |
| 7,542,007 | B2 | 6/2009 | Yamaguchi |
| 10,595,281 | B2 | 3/2020 | Lindenmeier et al. |
| 11,374,604 | B2 | 6/2022 | Barany |
| 2010/0053836 | A1* | 3/2010 | Xiu ............................ H03F 1/52 361/119 |
| 2010/0251322 | A1* | 9/2010 | Palinkas ................ H04N 7/102 725/127 |
| 2011/0099601 | A1 | 4/2011 | Riggsby |
| 2011/0181371 | A1* | 7/2011 | Alkan ................. H04L 12/2838 333/132 |
| 2012/0081190 | A1 | 4/2012 | Rijssemus |
| 2013/0342272 | A1* | 12/2013 | Riggsby .................... H03F 3/19 330/185 |
| 2017/0237141 | A1 | 8/2017 | Alkan et al. |
| 2018/0160171 | A1 | 6/2018 | Wells et al. |
| 2018/0217456 | A1 | 8/2018 | Vilenskiy |
| 2019/0014286 | A1 | 1/2019 | Alkan et al. |
| 2019/0074904 | A1* | 3/2019 | Lin ................... H04B 10/25751 |
| 2019/0116057 | A1* | 4/2019 | Colson ............... H04L 12/2801 |
| 2019/0222807 | A1 | 7/2019 | Rivard et al. |
| 2019/0294017 | A1 | 9/2019 | Vigano |
| 2019/0320134 | A1* | 10/2019 | Barany .............. H04N 7/17309 |
| 2020/0322572 | A1* | 10/2020 | Barany ................. H04N 7/104 |

OTHER PUBLICATIONS

Harry Kim (Authorized Officer), International Search Report and Written Opinion dated Sep. 27, 2021, PCT Application No. PCT/US2021/038239, 9 pages.

* cited by examiner

FREQUENCY CONVERTING CABLE NETWORK SIGNAL TRANSMISSION DEVICES

CROSS-REFERENCE TO RELATED APPLICATION

This application is a continuation of U.S. application Ser. No. 17/850,099, filed Jun. 27, 2022, which is a continuation of U.S. application Ser. No. 17/353,122, filed Jun. 21, 2021, now U.S. Pat. No. 11,374,604, which claims priority to U.S. Provisional Patent Application No. 63/042,627, filed Jun. 23, 2020. The entirety of both applications is incorporated by reference herein.

BACKGROUND

Cable television (CATV) networks generally include devices and cables that deliver downstream signals from a headend to many subscriber premises. This infrastructure is also capable of receiving upstream signals from the subscriber premises and transmitting the upstream signals back to the headend. The upstream and downstream signals are typically in different frequency bands, allowing them to travel along the same lines. Traditional frequency bands are between 5 MHz and 1002 MHz, e.g., 5-42 MHz for upstream signals, and 54-1002 MHz for downstream signals. These frequency bands have been implemented successfully, and lines, devices, etc. in many networks are designed specifically to handle these frequencies with manageable levels of attenuation, tilt, etc.

Recently, however, there has been interest in increasing the frequency band for the signals, especially in the downstream direction. Such increases can produce faster connectivity for the subscriber premises, allowing each individual subscriber premise to be assigned to a larger frequency band (i.e., a larger portion of the total available downstream frequency band). However, increasing the total frequency band is accomplished generally by increasing the high end of the frequency range, e.g., to frequencies of up to 1800 MHz, 3000 MHz or higher. Signal attenuation may become an issue at the high end of such widened frequency bands. For example, at such higher frequencies, the signals can experience high levels of tilt, a situation in which attenuation increases as a function of frequency (i.e., more power losses at higher frequencies). Further, in some circumstances, high-cost equipment is necessary to effectively split and amplify signals at such high frequencies.

SUMMARY

A network communication device is disclosed. The device includes an input port configured to receive a downstream signal from a network, a first output port in communication with the input port and configured to receive a first reduced-power version of the signal received at the input port, one or more second output ports, and a converting circuit configured to receive a second reduced-power version of the signal received at the input port, down-convert a high-frequency portion thereof, and produce a down-converted signal. The one or more second output ports receive at least a portion of the down-converted signal.

A communication network is disclosed. The network includes a headend configured to provide a downstream signal, a first network device having a first input configured to receive the downstream signal, a first output port configured to provide a lower-power version of the downstream signal, and one or more second output ports configured to provide another lower-power version of the downstream signal to one or more first subscriber devices, and a second network device having a first input configured to receive the downstream signal, a first output port configured to provide a second lower-power version of the downstream signal, and one or more second output ports configured to provide a down-converted signal to one or more second subscriber devices downstream from the second network device. The second network device includes a converting circuit configured to receive a second lower-power version of the downstream signal, separate the second lower-power version of the signal into a high-frequency portion, a low-frequency portion, and a middle-frequency portion, attenuate the middle-frequency portion, down-convert the high-frequency portion to the middle-frequency portion, and combine the low-frequency portion and the middle-frequency portion after down-converting the high-frequency portion to the middle-frequency portion to produce the down-converted signal.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

DETAILED DESCRIPTION

Embodiments of the present disclosure may provide a cable network device, e.g., passive splitter/directional coupler or a tap that connects several subscriber premises to a trunk line. The device is configured to down-convert downstream signals to some subscriber premises, while leaving the signal unconverted for other subscriber premises. Accordingly, in networks implementing these devices, downstream signals to these two groups of subscribers may have the same frequencies in one portion of the network (e.g., the portion from the tap to the subscriber premises, or downstream from the passive splitter), while occupying different frequency bands in another portion (e.g., upstream of the tap or passive splitter). As such, the network may provide for the larger frequency spectrum in the delivery network away from the subscriber premises, while allowing the subscriber's devices to operate solely in the lower frequency spectrum.

Figure 1:
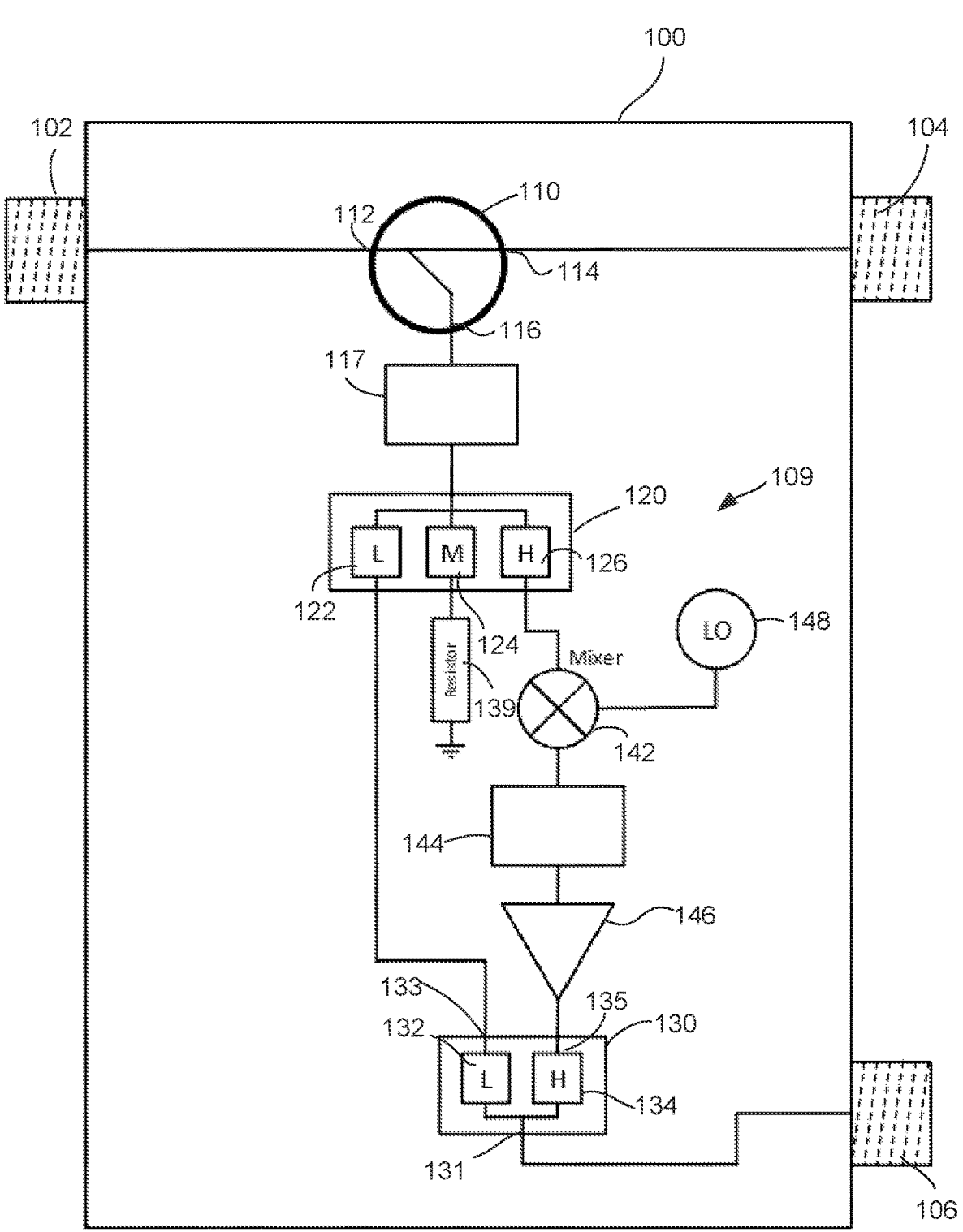
FIG. 1 illustrates a schematic view of a line splitter for a communication network, according to an embodiment.

Turning now to the specific, illustrated embodiments, FIG. 1 illustrates a schematic view of a first network device, e.g., a line passive splitter/directional coupler ("line splitter") 100, according to an embodiment. The line splitter 100 may include an input port 102, a first output port 104, and a second output port 106. The line splitter 100 may be installed in the delivery network, upstream of the subscriber premises, such that it is not directly connected to such subscriber premises, but generally has one or more taps therebetween. The line splitter 100 may, for example, be installed at street intersection, with one output going down one road and another going down the other, for connection to the subscriber premises on the respective roads (via a tap). Accordingly, the input port 102 may be configured to be coupled to an upstream trunk line in communication with the headend. The output ports 104, 106 may be coupled to downstream trunk lines, for eventual connection to a tap that communicates with subscriber devices.

A directional coupler 110 may be positioned between the input port 102 and the first output port 104. A common terminal 112 of the directional coupler 110 may be coupled to the input port 102, and a first leg terminal 114 of the directional coupler 110 may be coupled to the first output port 104. The directional coupler 110 may also include a second leg terminal 116, which may receive a portion of the signal (e.g., a lower-power version of the signal across the same frequency spectrum) from the input port 102.

The second leg terminal 116 may be coupled to the second output port 106 via a shaping circuit 107 and a converting circuit 109. The shaping circuit 107 may operate to flatten the "tilt" in the signal (lower power in the upper frequency ranges) or reduce RF level, such that the signal downstream is reasonably flat.

The converting circuit 109 may include a first filter 120 configured to separate the signal received at the second leg terminal 116 into three portions (e.g., a triplex filter) based on frequency, e.g., a high-frequency portion, medium-frequency portion, and low-frequency portion. However, it will be appreciated that the use of three portions is merely an example, and the first filter 120 could instead be configured to separate the signal into any number of frequency bands. As an example, the first filter 120 may include a low-pass filter 122, a band-pass filter 124, and a high-pass filter 126. In a specific embodiment, the low-pass filter 122 may block signals having frequencies above 204 MHz, the band-pass filter 124 may block signals with frequencies outside of the range of 258 MHz-1500 MHz, and the high-pass filter 136 may block signals with frequencies below 1758 MHz. Accordingly, the low-pass filter 132 passes a low-frequency signal, the band-pass filter 134 passes a medium-frequency signal, and the high-pass filter 136 passes a high-frequency signal. In other embodiments, other specific frequencies may be used.

The converting circuit 109 may also include a second filter 130, which may be configured to combine a low-frequency signal and a high-frequency signal into one signal, which is delivered to the second output port 106. The second filter 130 may include a common terminal 131, a low-pass terminal 133, and a high-pass terminal 135. The second filter 130 may also be configured to receive upstream signals from the second output port 106 at the common terminal 131 and separate the upstream signals according to frequency. In other words, the second filter 130 may be a diplex filter; however, it will be appreciated that the second filter 130 may be configured to separate/combine any number of signals. Accordingly, in this embodiment, the second filter 130 may include a low-pass filter 132 coupled to the low-pass terminal 133 and a high-pass filter 134 coupled to the high-pass terminal 135.

The low-pass filter 132 may be configured to permit transmission of signals in a frequency range of 5-204 MHz (e.g., the low-frequency range), and the high-pass filter may be configured to pass signals in a frequency range of 258-1500 MHz (e.g., the medium frequency range). The low-pass filter 132 may be configured to block (e.g., attenuate, substantially prevent, etc.) signals that are higher than the low-frequency range from passing between the low-pass terminal 133 to the common terminal 131, and vice versa. The high-pass filter 134 may be configured to block signals that are lower than the medium frequency range from passing between the high-pass terminal 135 and the common terminal 131.

The low-pass filter 122 of the first filter 120 may be coupled to the low-pass filter 132 of the second filter 130. The band-pass filter 124 of the first filter 120 may be terminated to ground, e.g., via a resistor 139. As such, the power in the medium-frequency band of the input signal may be attenuated. The high-pass filter 126 may be coupled to the high-pass filter 134 of the second filter 130 via a mixer 142, a shaping circuit 144, and an amplifier 146 (or another gain stage). A signal from a local oscillator 148 may be mixed with the high-frequency signal using the mixer 142, so as to change the frequency by heterodyning to the medium-frequency band, which, as noted above, is lower than the high-frequency band. The down-converted signal, previously in the high-frequency band, and now in the medium-frequency band, may then be passed to the high-pass filter 134 of the second filter 130. The second filter 130 may then combine the low-frequency signal and the down-converted signal, and pass the combination thereof to the second output port 106. Accordingly, the converting circuit 109 may serve to remove the medium-frequency range portion of the signal received at the second leg terminal 116, and substitute it with the signal that is in the high-frequency band of the signal received at the second leg terminal 116.

Thus, in operation, the line splitter 100 may serve to provide a first downstream signal at the first output port 104, and a second downstream signal at the second output port 106. Subscriber devices that are downstream from the first output port 104 and subscriber devices that are downstream from the second output port 106 may be configured to operate on the same frequency bands, e.g., the low and medium-frequency bands. The first downstream signal, however, may not be converted, as it does not pass through the converting circuit 109, and thus may provide the full spectrum of frequencies, including those in the high-frequency band, outside the operating ranges of the downstream subscriber devices to the subscriber devices. However, these subscriber devices may not be assigned to frequencies in the high-frequency band; rather, data intended for these subscriber devices may be routed thereto via the medium-frequency band from the headend. The second downstream signal may be partially down-converted, e.g., such that the high-frequency portion of the signal is converted to the medium-frequency portion. As such, the data that was carried from the headend to the line splitter 100 in the high-frequency band now resides in the medium-frequency band, and can be transmitted for use by the subscriber devices that are downstream of the second output port 106. As such, subscriber devices downstream from the first output port 104 may be assigned to the same frequencies in the middle frequency band as one or more subscriber devices downstream from the second output port 106, while receiving different data from the headend.

Figure 2:
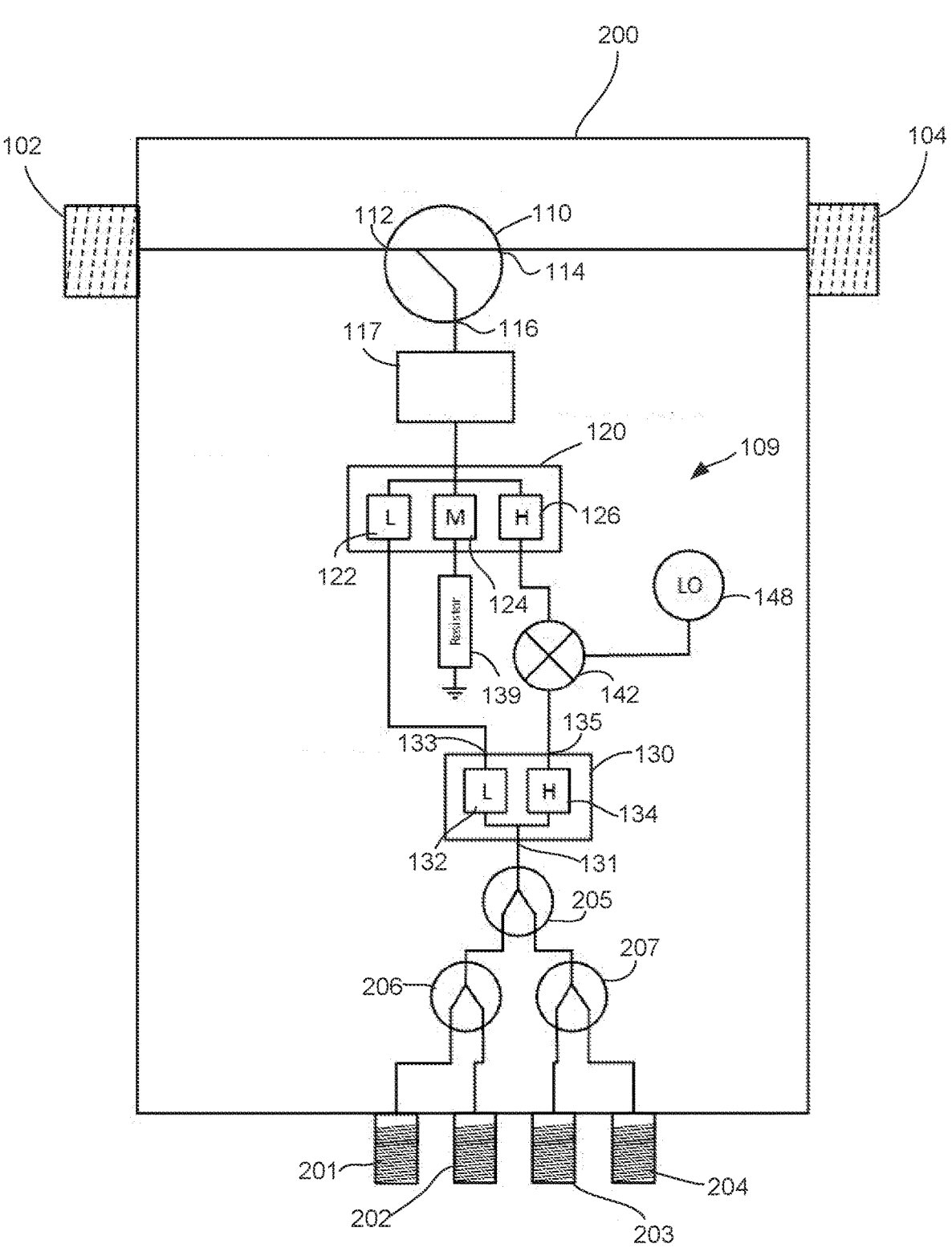
FIG. 2 illustrates a schematic view of a tap for a communication network, according to an embodiment.

FIG. 2 illustrates a schematic view of a second network device, e.g., a tap 200, according to an embodiment. The tap 200 may operate similarly to the line splitter 100, and like components are indicated with like reference numbers and the structure and operation thereof are not described again. The tap 200 includes a plurality of subscriber ports 201-204. A plurality of splitters 205-207 are provided to split the downstream signal from the second filter 130. For example, the splitters 205-207 may be arranged in a cascade, as shown, and coupled to the subscriber ports 201-204. The splitters 205-207 may thus be configured to produce progressively lower-power signals that are delivered to the ports 201-204. A drop cable (e.g., coaxial cable) may be coupled to each of the ports 201-204 so as to deliver the downstream signals to the subscriber premises. The split field may optionally be a two, four, or eight way matrix.

The tap 200 may be used in the network in conjunction with a conventional tap that does not down-convert the high-frequency signals to the medium frequency range. Accordingly, similarly to the line splitter 100 discussed above, some subscriber premises may receive an unconverted signal, while others (downstream of the subscriber ports 201-204 of the tap 200) may receive the down-converted signal. As such, one or more of the subscriber devices coupled to the ports 201-204 may be assigned to the same downstream frequency band as one or more subscriber devices that are not downstream from first output port 104. However, because the high-frequency band is down-converted in the tap 200, data assigned to a subscriber device coupled to one of the ports 201-204 may be transmitted to the tap 200 in the high-frequency band, i.e., in a different frequency from the data assigned to the subscriber device that receives the unconverted signal, e.g., via a conventional tap. Thus, without changing the operating parameters of the subscriber device, or risking high attenuation in lines extending from the tap 200 to the subscriber premises, the bandwidth of the downstream signals occupies both the high and medium frequency bands.

Considering upstream signals, a first upstream signal may be received at the first output port 104, and may pass through the directional coupler 110 to the input port 102 with minimal or no attenuation, alteration, or conditioning. A second upstream signal may be received at the second output port 106 and divided based on frequency into a low-frequency signal and a medium frequency signal by the second filter 130. The low-frequency signal may be fed to the low-pass filter 122 of the first filter 120. The medium-frequency signal may be blocked or otherwise attenuated, e.g., by the amplifier 146. In the upstream direction, data signals are generally in the low-frequency band, with power found in the higher-frequency bands generally representing noise or otherwise signals that are advantageously blocked from reaching the headend.

In some embodiments, as shown, the tap 200 may not include the amplifier 146 or shaping circuit 144 between the high-pass filters 126, 134 of the first and second filters 120, 130, which are included in the line splitter 100 of FIG. 1. However, in some embodiments, an amplifier and/or shaping circuit may be provided in this position, or elsewhere.

Figure 3:
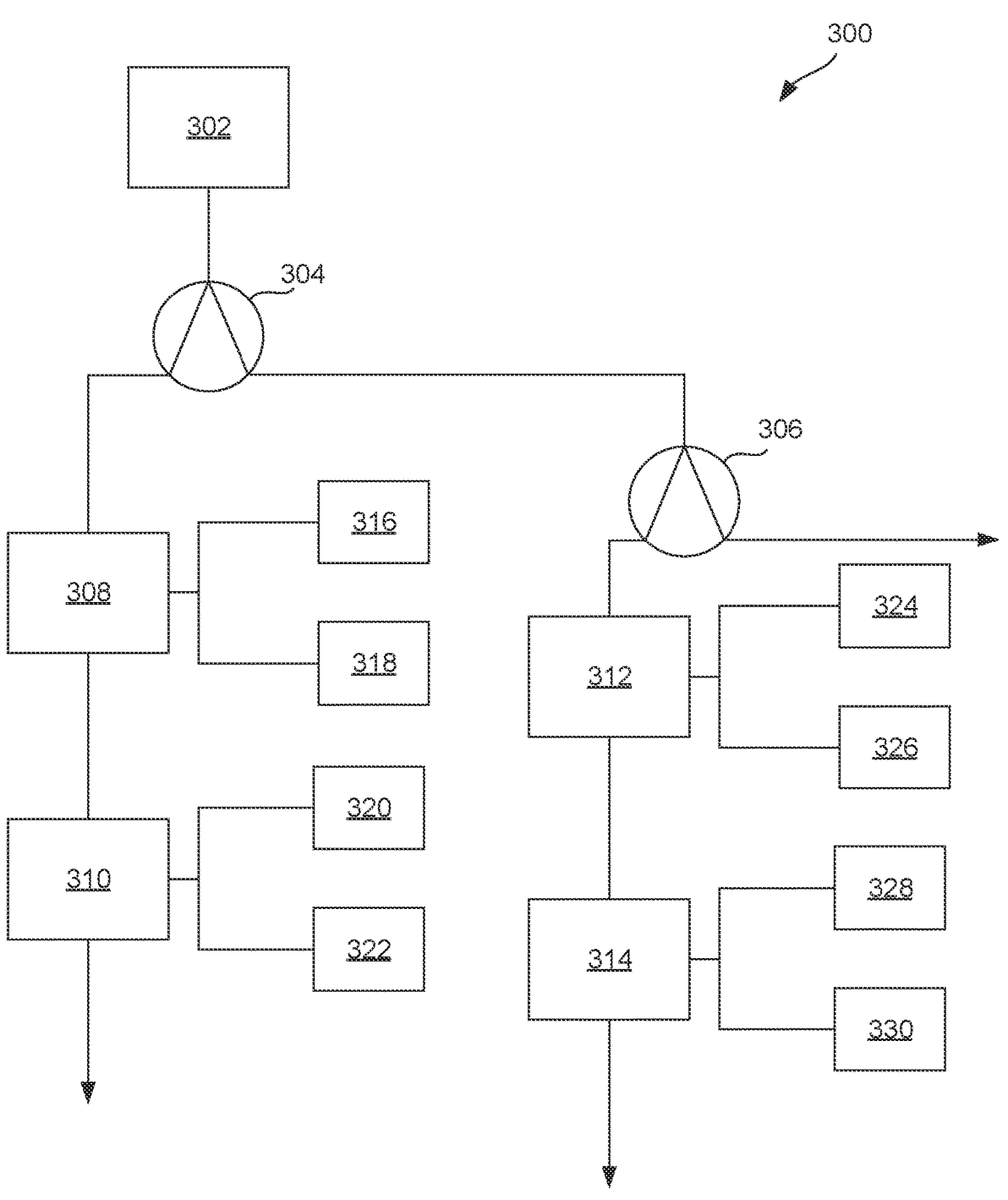
FIG. 3 illustrates a simplified, schematic view of part of a communication network, according to an embodiment.

FIG. 3 illustrates a simplified, schematic view of part of a communications network 300 that may implement one or more embodiments of the network devices 100, 200 described above, according to an embodiment. The network 300 may be a cable television network adapted for transmission of data both upstream and downstream. For example, the network 300 may include a headend 302, a first splitter 304, a second splitter 306, and first-fourth taps 308-314. The splitters 204, 206 and taps 308-314 may be connected together via a large-diameter cable (trunk line) configured to handle high-frequency, high-power signal transmission. Each of the taps 308-314 may be coupled to one or more subscriber devices 316-330, as shown, e.g., via a smaller-diameter, coaxial drop cable.

In a first example, the first splitter 304 may be an implementation of the line splitter 100 discussed above, and the second splitter 306 may be a conventional splitter. The first splitter 304 may thus be configured to receive a downstream signal from the headend 302, and provide a lower-power version thereof to the second splitter 306 (one or more amplifiers may be provided to increase the power of this signal between the splitters 304, 306, without departing from the scope of this description). The second splitter 306 may then operate to deliver the downstream signal to the subscriber devices 324-330 via the taps 312, 314. The first splitter 304 may also be configured to deliver a down-converted version of the signal from the headend 302 to the subscriber devices 316-322 via the taps 308, 310. Thus, the subscriber devices 324-330, each of which is downstream from the first splitter 304, may each be assigned to a downstream bandwidth in the middle-frequency band, and, further, some of the subscriber devices 316-322 may be assigned to downstream frequency bands that are the same or overlapping with those to which the subscriber devices 324-330 are assigned; however, upstream of the first splitter 304, these signals are carried on different frequencies (e.g., the signals to which the subscriber devices 316-322 are assigned are in the high-frequency band, while the signals to which the subscriber devices 324-330 are assigned are in the medium-frequency band).

In another example, the first splitter 304 may be conventional, and the first tap 308 may be an example of the tap 200, discussed above. Accordingly, the signal from the headend 302 is routed via the first splitter 304 to the first tap 308. The first tap 308 passes through a lower-power version of the signal to the second tap 310, for distribution to the subscriber devices 320, 322. The first tap 308 also passes a down-converted version of the downstream signal to the subscriber devices 316, 318. Thus, the subscriber devices 316, 318 may be assigned to the same frequency band as the subscriber devices 320, 322, but the signals may be carried from the headend to the tap 308 separately on the high and medium frequency bands.

It will be appreciated that in this example, the second splitter 306 may be conventional or may be an example of the line splitter 100 discussed above. Further, the third and fourth taps 312, 314 may be conventional or may be an example of the tap 200. Any combination of conventional splitters, splitters 100, conventional taps, and taps 200 may be used in various embodiments, to broaden the downstream frequency band available to the subscriber devices. Moreover, the network 300 may include multiple additional splitters, taps, subscriber premises, signal conditioning devices (e.g., amplifiers), etc.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What is claimed is:

1. A network communication device for down-converting a portion of a signal to a lower frequency for use by a subscriber device, comprising:
   a converting circuit configured to separate an input signal into a high-frequency portion, a low-frequency portion, and a middle-frequency portion, attenuate the middle frequency portion, and down-convert the high-frequency portion to a down-converted middle-frequency portion; and
   wherein the network communication device is configured to output the down-converted middle-frequency portion of the signal to the subscriber device so as to enable use of high frequency signals with pre-existing subscriber equipment;
   wherein the converting circuit comprises a first filter having a high-pass filter, a band-pass filter, and a low-pass filter, wherein the band-pass filter is terminated to a ground;
   further comprising a second filter having a high-pass filter and a low-pass filter, wherein the low-pass filter of the second filter is coupled to the low-pass filter of the first filter; and
   wherein the converting circuit further includes a mixer and an oscillator in communication with the mixer, the mixer being in communication with the high-pass filter of the first filter and the high-pass filter of the second filter, such that downstream signals pass from the high-pass filter of the first filter to the high-pass filter of the second filter via the mixer, wherein the mixer and the oscillator are configured to down-convert the signals received at the mixer from a high-frequency range to a medium-frequency range.

2. The network communication device of claim 1, further comprising a directional coupler configured to reduce a power of the input signal before the converting circuit separates the input signal into the high-frequency portion, the low-frequency portion, and the middle-frequency portion.

3. The network communication device of claim 1, wherein the high-pass filter of the first filter is configured to block signals below a high-frequency cutoff, and wherein the high-pass filter of the second filter is configured to block signals below a medium-frequency cutoff, the medium-frequency cutoff being lower than the high-frequency cutoff.

4. The network communication device of claim 1, wherein the low-pass filter of the first filter is configured to block signals above about 204 MHz, the band-pass filter is configured to block signals outside of a frequency band of 258 MHz to 1500 MHz, and the high-pass filter of the first filter is configured to block signals below about 1758 MHz.

5. The network communication device of claim 4, wherein the low-pass filter of the second filter is configured to block signals above 204 MHZ, and wherein the high-pass filter of the second filter is configured to block signals below 1500 MHz.

6. A network communication device for down-converting a portion of a signal to a lower frequency for use by a subscriber device, comprising:
   a first output port configured to receive a first reduced-power version of a signal received at an input port;
   a converting circuit configured to receive a second reduced-power version of the signal, separate the second reduced-power version of the signal into a high-frequency portion, a low-frequency portion, and a middle-frequency portion, attenuate the middle-frequency portion, down-convert the high-frequency portion to a down-converted middle-frequency portion, and combine the low-frequency portion and the down-converted middle-frequency portion after down-converting the high-frequency portion to produce a down-converted signal; and wherein the down-converted signal is configured to be output to the subscriber device so as to enable use of high frequency signals with pre-existing subscriber equipment.

7. The network communication device of claim 6, further comprising a directional coupler configured to reduce a power of the input signal before the converting circuit separates the input signal into the high-frequency portion, the low-frequency portion, and the middle-frequency portion.

8. The network communication device of claim 6, wherein the converting circuit is further configured to attenuate the input signal.

9. The network communication device of claim 6, wherein the converting circuit comprises a first filter having a high-pass filter, a band-pass filter, and a low-pass filter, wherein the band-pass filter is terminated to a ground.

10. The network communication device of claim 9, further comprising a second filter having a high-pass filter and a low-pass filter, wherein the low-pass filter of the second filter is coupled to the low-pass filter of the first filter.

11. The network communication device of claim 10, wherein the converting circuit further includes a mixer and an oscillator in communication with the mixer, the mixer being in communication with the high-pass filter of the first filter and the high-pass filter of the second filter, such that downstream signals pass from the high-pass filter of the first filter to the high-pass filter of the second filter via the mixer, wherein the mixer and the oscillator are configured to down-convert the signals received at the mixer from a high-frequency range to a medium-frequency range.

12. The network communication device of claim 11, wherein the high-pass filter of the first filter is configured to block signals below a high-frequency cutoff, and wherein the high-pass filter of the second filter is configured to block signals below a medium-frequency cutoff, the medium-frequency cutoff being lower than the high-frequency cutoff.

13. The network communication device of claim 11, wherein the low-pass filter of the first filter is configured to block signals above about 204 MHz, the band-pass filter is configured to block signals outside of a frequency band of 258 MHz to 1500 MHz, and the high-pass filter of the first filter is configured to block signals below about 1758 MHz.

14. The network communication device of claim 13, wherein the low-pass filter of the second filter is configured to block signals above 204 MHz, and wherein the high-pass filter of the second filter is configured to block signals below 1500 MHz.

15. A network communication device for down-converting a portion of a signal to a lower frequency portion for use by a subscriber device, comprising:

a first output port in communication with an input port and configured to receive a first reduced-power version of the signal received at an input port;

a second output port;

a converting circuit configured to receive a second reduced power version of the signal, separate out the second reduced power version of the signal into a high-frequency portion, a low-frequency portion, and a middle-frequency portion, and down-convert the high-frequency portion of the signal to produce a down-converted signal; and wherein the down-converted signal is configured to be output to the subscriber device so as to enable use of high frequency signals with pre-existing subscriber equipment.

16. The network communication device of claim 15, further comprising a directional coupler configured to reduce a power of the signal before the converting circuit separates the signal into the high-frequency portion, the low-frequency portion, and the middle-frequency portion.

17. The network communication device of claim 15, wherein the converting circuit comprises a first filter having a high-pass filter, a band-pass filter, and a low-pass filter, wherein the band-pass filter is terminated to a ground.

* * * * *